United States Patent
Lampert

(12) United States Patent (10) Patent No.: US 6,652,155 B2
Lampert (45) Date of Patent: Nov. 25, 2003

(54) OPTICAL CONNECTOR PLUG

(75) Inventor: Norman R. Lampert, Norcross, GA (US)

(73) Assignee: Fitel USA Corp., Norcross, GA (US)

( * ) Notice: Subject to any disclaimer, the term of this patent is extended or adjusted under 35 U.S.C. 154(b) by 34 days.

(21) Appl. No.: 09/886,345

(22) Filed: Jun. 21, 2001

(65) Prior Publication Data

US 2002/0197018 A1 Dec. 26, 2002

(51) Int. Cl.[7] ................................................ G02B 6/36
(52) U.S. Cl. ....................................................... 385/76
(58) Field of Search ............................. 385/76, 92, 78, 385/902, 86–88, 117–119, 123, 125, 14, 147; 439/188, 441, 577

(56) References Cited

U.S. PATENT DOCUMENTS

| | | | |
|---|---|---|---|
| 4,869,566 A | * 9/1989 | Juso et al. | 385/53 |
| 5,212,752 A | 5/1993 | Stephenson et al. | 385/78 |
| 5,222,164 A | * 6/1993 | Bass et al. | 385/14 |
| 5,334,034 A | * 8/1994 | Reichardt et al. | 439/188 |
| 5,570,445 A | * 10/1996 | Chou et al. | 385/92 |
| 5,687,268 A | 11/1997 | Stephenson et al. | 385/73 |
| 5,904,581 A | * 5/1999 | Pope et al. | 439/74 |

OTHER PUBLICATIONS

U.S. patent application No. 09/748,906; filed Dec. 27, 2000 to Lampert, entitled Optical Connector Receptacle Having Switching Capability.

* cited by examiner

*Primary Examiner*—Jean F. Duverne
(74) *Attorney, Agent, or Firm*—Thomas, Kayden, Horstemeyer & Risley, LLP

(57) ABSTRACT

An optical fiber connector plug for insertion in an adapter wherein the connector plug has a conductive member on the latching arm forming latching shoulders for engaging the latch stops on the ends of latching ribs in the adapter and for activating a sensor mechanism such as spaced electrical contacts within the adapter. Leads from each of the contacts are connected to a central processing unit which detects the connection made and signals a switch to turn on the laser or other light source power. Thus, laser power is not turned on until the connector plug is completely seated within the adapter. Removal of the plug requires depression of the latching arm, thereby breaking the circuit and turning the laser off prior to the removal of the connector plug.

19 Claims, 5 Drawing Sheets

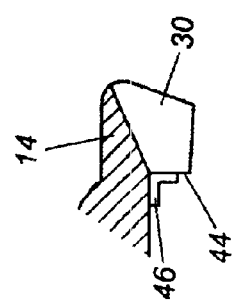
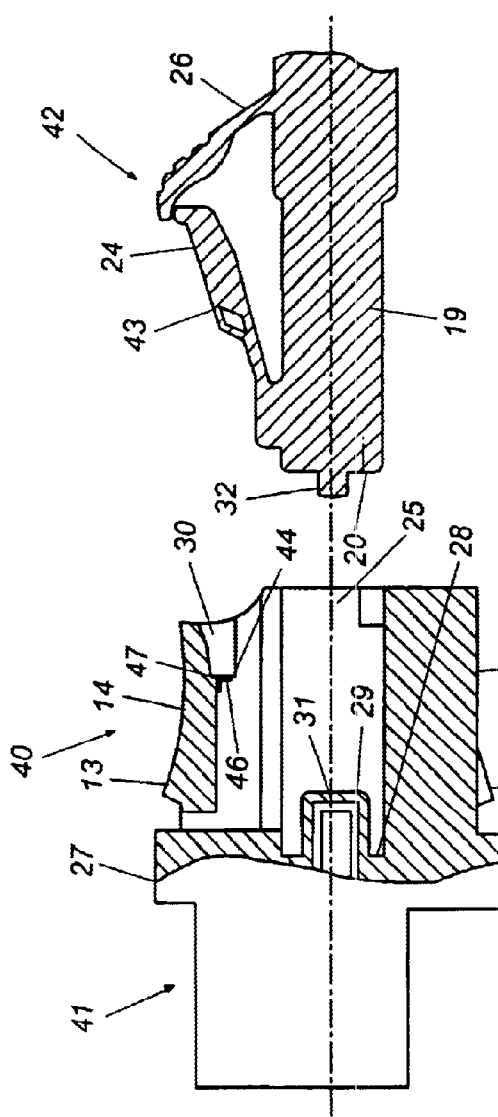
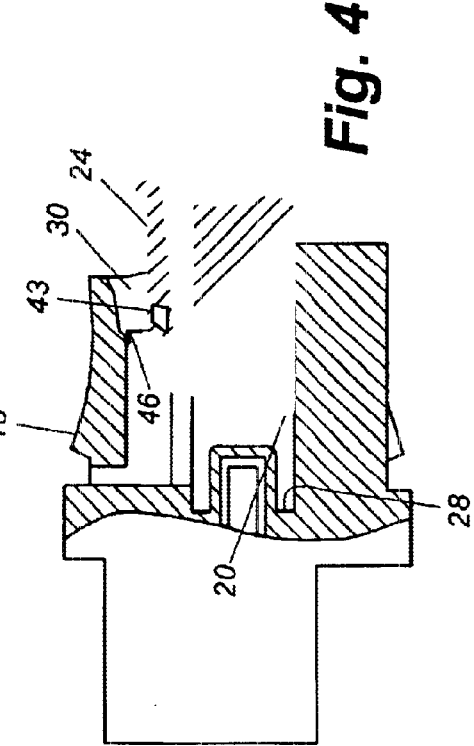

OPTICAL CONNECTOR PLUG

RELATED APPLICATIONS

This application is related to U.S. patent application Ser. No. 09/748,906 of N. Lampert (the present inventor) which was filed on Dec. 27, 2000, the disclosure of which is incorporated by reference herein.

FIELD OF THE INVENTION

This invention relates to optical connectors and connector plugs therefor for creating an electrical and/or optical indication of the condition of the connector relative to the adapter.

BACKGROUND OF THE INVENTION

Optical fiber transmission systems are becoming widely used in the transmission of signals such as data, voice and the like, and in many instances, are replacing traditional electrical systems. Many of the arrangements common to electrical systems, such as coupling, interconnection, splicing, and the like have their counterparts in optical systems but, because of the totally different characteristics of the transmission media, i.e., optical fiber versus metallic wire, connectorization, splicing, and the like, a quite different apparatus is involved. Where, for example, it is necessary to make a great number of connections in one location, both systems may use what is referred to in the art as patch panels, which provide arrays of connector adapters for interconnection, but the interconnections themselves are generally quite different.

It is common practice in the optical connector art to terminate a length of optical fiber with a connector, an example of which is the SC type connector that is shown and described in U.S. Pat. No. 5,212,752 of Stephenson et al. There are numerous types of such fiber terminating connectors, and, inasmuch as there has been some effort directed to standardization, each type of connector generally requires a different coupling arrangement to permit interconnection of two fibers, for example. The SC and LC connectors are becoming more and more popular, and the remainder of the discussion, in the interest of simplicity, is devoted to such connectors. It is to be understood that the following description of the principles and apparatus of the invention is applicable to other types of connectors as well. As is shown in the Stephenson et al. patent, an SC connector includes a ferrule assembly including a barrel having a collar at one end and an optical fiber terminating ferrule projecting from the barrel. The ferrule assembly is disposed in a plug frame such that an end portion of the ferrule projects from one end of the frame. The plug frame is configured to snap lock into a grip member having a locating key thereon, and the grip is inserted into one side of a slotted coupler adapter, with the locating key inserted into the slot. The grip of a corresponding SC connector is inserted into the other side of the adapter so that the ends of the ferrules abut each other to form a low insertion loss optical interconnection. In the SC connector, the ferrules are spring loaded longitudinally to insure contact between the fiber containing ferrule ends. The entire interconnect operation involves linear motion only and results in a low insertion loss, mechanically stable, protected junction between the two fibers. The expenditure of time in making the interconnection is small and the operator or installer is relieved of having to perform anything other than simple linear motion in plugging the connectors into the coupling adapter. The LC type connector also involves only linear motion and results, when in its adapter, in low insertion loss, mechanical stability, and a protected junction.

In virtually any connector arrangement, however, there is potentially a safety hazard that can be present. Where one or more of the pre-connectorized fibers is carrying optical energy, such energy can be emitted from the end of the fiber connector and pass through the unoccupied buildout block or coupling adapter to the side of the panel where connections are to be made. This optical energy can be harmful for the operator or installer and can be especially harmful to his or her eyes. This hazard is most prevalent when an active connection has to be repaired, cleaned, or otherwise altered by removing an existing connectorized fiber and replacing it with another. In such an instance, it might be difficult or otherwise impractical to shut off the signal transmission in that particular fiber circuit, hence the installer is forced to deal with a light emitting junction or connection. The danger to the operator or installer becomes greater as the optical power is increased, which is a present aspect of the art, where higher and higher optical power, e.g, greater than one watt, is being transmitted. This hazard has long been recognized and there are numerous arrangements in the prior art for blocking any light emanating from a fiber connection through an open adapter. In U.S. Pat. No. 5,678,268 of Stephenson, et al., there is shown a pivotable optical shutter arrangement wherein a normally closed pivotable shutter blocks the open exit of an adapter when a connector plug is removed. The shutter advantageously requires only one motion to open it to permit insertion of a plug or connector into the adapter. Such a shutter as shown in the patent is operable by only one hand instead of prior art arrangements which generally require awkward use of two hands by the installer. One of the disadvantages of any shutter arrangement however, is that they are easily "defeatable" in that they can be, during installation of large numbers of connectors and in the interest of expedition, for example, temporarily fixed in the open position, thus contravening their purpose. In addition, the fiber optic transmission art has progressed to the use of higher and higher light energy or power, and has reached a point where shutter arrangements in general have, because of the high light energy, become transparent to much of that energy in the form of infra-red light, which is commonly used. Where the light intensity is very high, actual damage to the optical connector and the associated fibers can occur.

In the aforementioned co-pending U.S. patent application of Lampert, the disclosure of which is incorporated herein by reference, several embodiments of the invention therein are shown, each being based upon a sensing mechanism in the adapter for signaling whether the adapter has a connector plug therein or when the adapter is vacant or empty. The signal thus generated is applied to a control circuit which activates or de-activates the laser which supplies optical power through the fiber to the connection. The laser is de-activated when the adapter has no connector plug therein, and is activated when there is a connector plug in place within the adapter. Included in that disclosure are embodiments which sense the impending insertion or removal of the connector plug from the adapter. Several of the embodiments shown in that application rely, for signal generation, on active devices, such as LEDs and detectors or Hall effect devices whereas a simpler arrangement not involving active devices would lessen the possibility of malfunction and would lend itself readily to systemwide standardization.

SUMMARY OF THE INVENTION

The present invention is an optical fiber connector plug wherein the plug, when inserted into an adapter having sensors therein causes a signal for activating the light source, such as a laser, produced after a sensing mechanism determines that the connector plug is fully seated in its operative position within the adapter, and the signal ceases upon indication to the sensing mechanism that the connector plug is about to be removed from the adapter. In this way the light from the fiber end never passes through an empty adapter. The connector plug of the invention is usable with any of a member of adapters having sensing means therein adapted to respond to the insertion of removal of the plug. In the following discussion, the sensing mechanism comprises first and second spaced electrical contacts.

In greater detail, the LC connector plug, for example, has a cantilevered latching arm on the connector plug for latching the plug to the adapter in the operative position in a known arrangement. The latching arm has first and second latching shoulders protruding laterally therefrom and the adapter has first and second spaced latching ribs, the undersurfaces of which bear against the latching shoulders and cam the latching arm down as the plug is being inserted. The ribs extend part of the way into the adapter and form latching stops at their inner ends which are spaced a predetermined distance apart. When the latching shoulders reach the ends of the ribs, the arm snaps upward, bringing the shoulders to bear against the latching stops at the rib ends to maintain the plug in its operative position. The plug can then only be removed by the latching arm being depressed sufficiently to remove the latching shoulders from contact with the latching stops.

In one embodiment of the invention, the latching stops have conductive material on the rib ends, thereby forming first and second electrical contacts which make up a sensing mechanism. The latching shoulders on the latching arm are spaced the predetermined distance apart and are formed by a metallic bar extending transversely through the latching arm, which, when in contact with the latching stops when the plug is fully inserted, shorts the two electrical contacts together, thereby completing a control circuit for turning on the light source. The circuit is completed only when the connector plug is fully seated, and, when the latching arm is depressed for removal of the plug, the circuit is immediately broken. Thus, the laser or other light source can only be on when the connector plug is fully seated within the adapter in its operative position and hence, there can be no light passing out of a vacant adapter.

Similar operative features may be adapted to other types of connector-adapter combinations. The features of the invention are most readily apparent from their embodiment in an LC type connector as set forth in the following detailed description, although the principles and features thereof are applicable to other types of connectors as well.

DESCRIPTION OF THE DRAWINGS

FIG. 3 is an elevation view in cross-section of an adapter and plug about to be inserted therein, embodying the principles of the present invention;

FIG. 3a is a detail of the rib 30 of the arrangement of FIG. 3;

FIG. 4 is an elevation view in cross-section of the plug of FIG. 3 inserted into the adapter of FIG. 3 but not yet seated therein;

DETAILED DESCRIPTION

Figure 1:
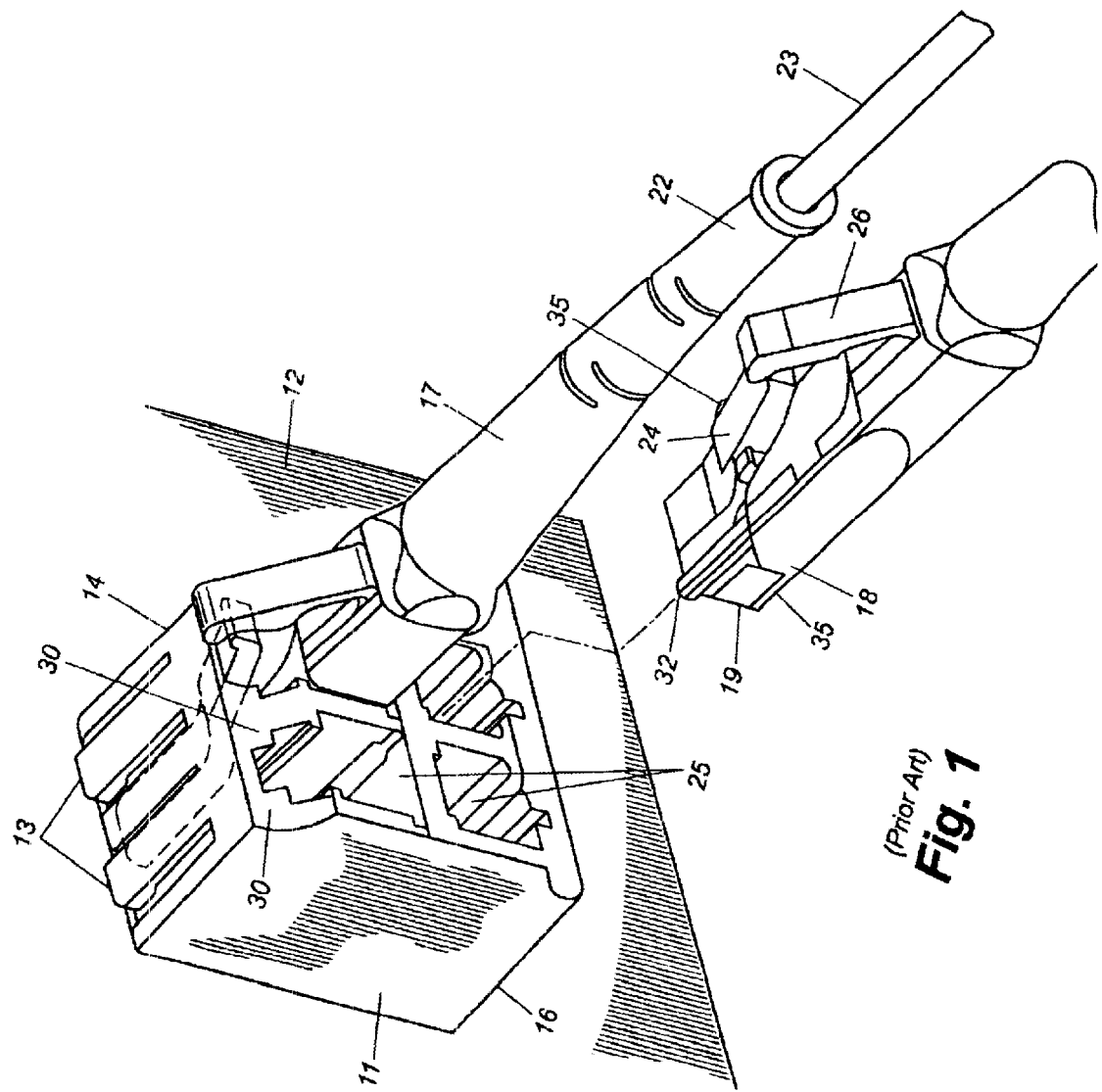
FIG. 1 is a perspective view of a quadriplex adapter and two connector plugs as currently used in the prior art.
Figure 2:
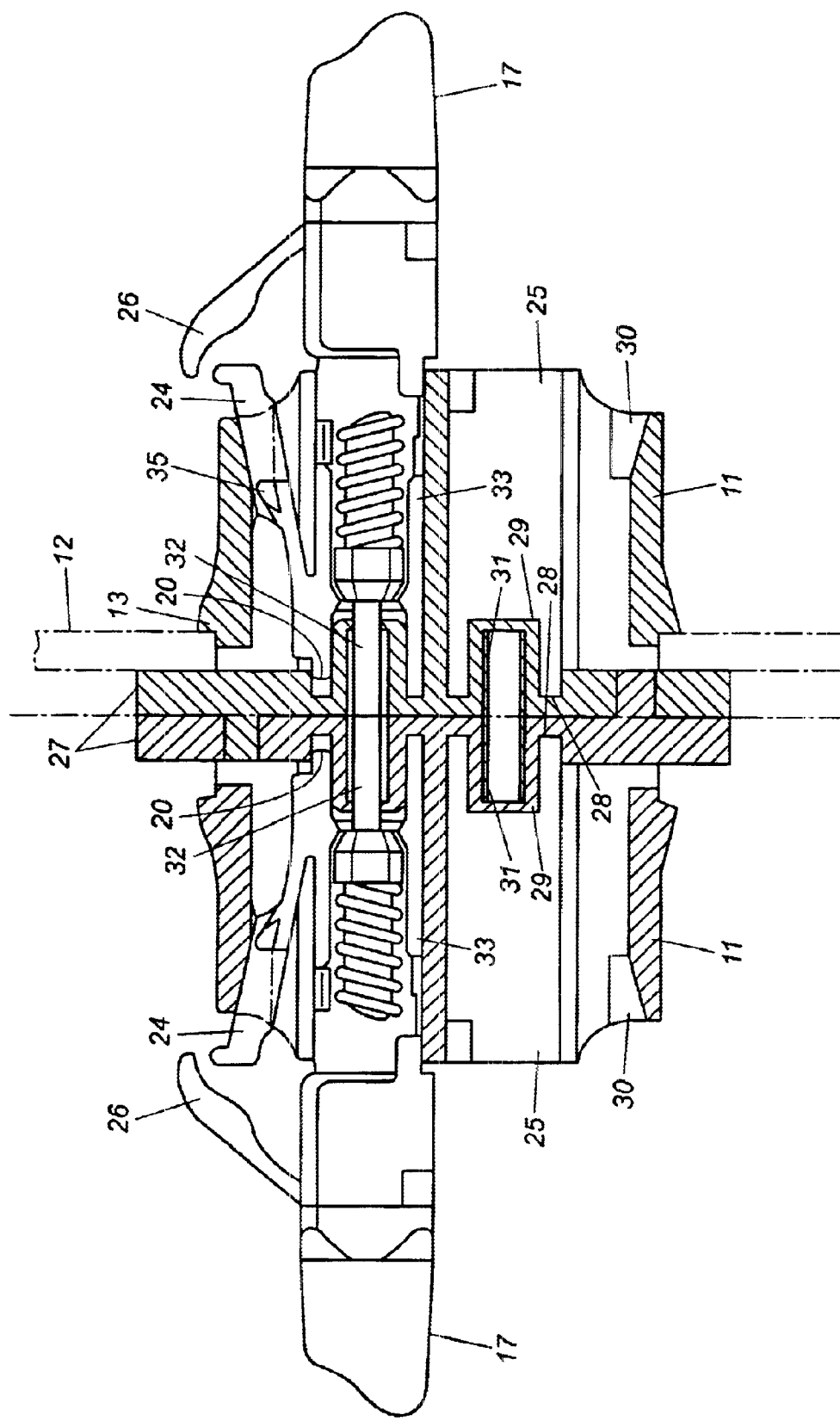
FIG. 2 is a side elevation view in cross-section of two connector plugs and an adapter showing two paths on a panel, as presently used in the prior art.

FIG. 1 is a perspective view of a quadraplex jack receptacle or adapter 11 mounted on a panel 12 and locked thereto by locking members 13. Adapter 11 is made of suitable plastic material and members 13 are molded into the top and bottom surfaces 14 and 16 respectively. An optical connector plug 17 of, for example, the LC type is shown mounted in one of the four rectangular cavities 25 of the adapter 11, and a similar connector plug 18 is shown positioned for insertion into another of the cavities 25 thereof. Each connector plug comprises a housing 19 that encloses a fiber holding structure. Connector plug 17 has a bend limiting boot 22 and terminates a cable 23. In like manner, connector 18 also terminates a cable, not shown. Both connectors 17 and 18 include a plug end 20, as best seen in FIG. 2, which is insertable in one of the cavities of adapter 11. As best seen with connector 18, each connector includes a resilient latching tab or arm 24, molded as part of connector 18, which serves to lock the connector within its receptacle, the cavity, by means of latching shoulders 35 which engage the interior ends of latching ribs 30, as seen more clearly in FIG. 2. Arm 24 includes a "living hinge" which allows it to be moved up and down relative to the central axis of the connector. A trigger 26 is also mounted or molded as part of the connector and has a free end overlying the distal end of arm 24. Trigger 26 has a "living hinge" and when its distal or free end is depressed, it depresses the distal end of arm 24 to unlatch the shoulders 35 from the ends of ribs 30 and hence, the connector 18 from the adapter (or jack receptacle) 11. It is to be understood that the adapter and connection shown in FIG. 1 are intended to be representative of several different types of connectors and adapters therefor, as is the assembly shown in FIG. 2.

FIG. 2 is a cross-sectional view of the arrangement of FIG. 1, and shows a second, mating adapter 11 which mates with the adapter 11 of FIG. 1, each of the adapters having mating flanges 27 which form, or are extensions of, end walls 28 of the adapters 11. Each end wall 28 has a protruding cylindrical member 29 having a bore therein, which, when the adapters are mated aligns with a corresponding bore in the other adapter. The two aligned bores contain an alignment sleeve 31 into which the optical fiber containing ferrules 32 of the two connectors 17 are inserted in butting relationship. When fully inserted in the mated receptacles that form adapter 11, the ends of ferrules 32 are maintained in abutment by means of springs 33, for example. When in this configuration, optical energy is transmitted from one connector to the other with minimized loss. It can be seen from FIG. 2 that if the right hand connector 17, as viewed in FIG. 2, is removed, light energy in the left hand connector 17 will be directed through the now empty cavity 25 of the right hand receptacle of adapter 11 in an unimpeded path. As discussed hereinbefore, this creates a hazardous condition, especially when the transmitted light is high intensity and/or collinated. It is clear in FIG. 2 how the latching shoulders 35 engage the inner ends, i.e., latch stops, of the ribs 30 to maintain the connector plug 17 in operative position.

Figure 5:
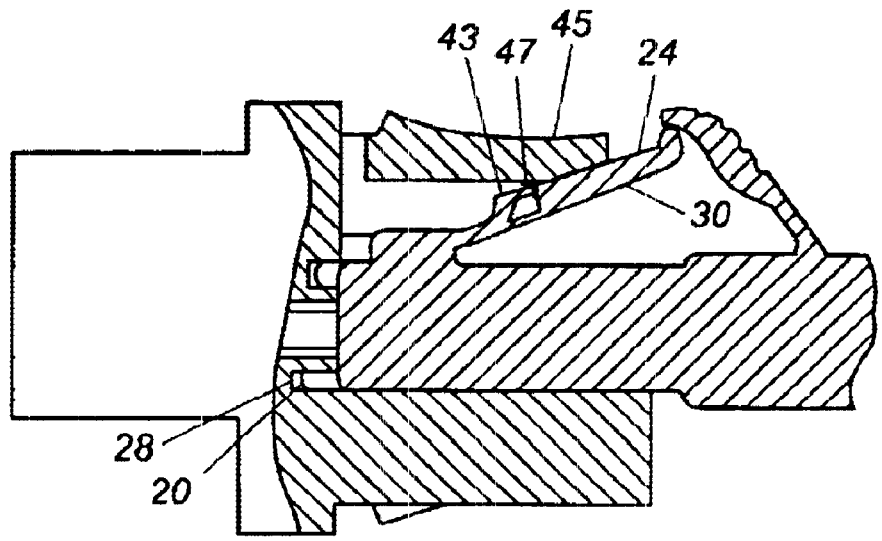
FIG. 5 is an elevation view in cross-section of the plug of the invention as seated in and latched to the adapter of the invention.
Figure 6:
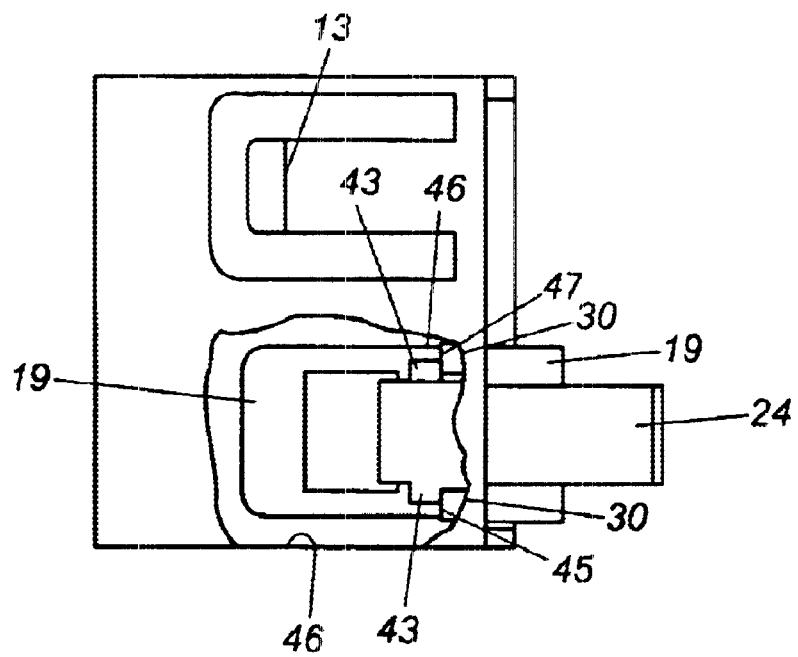
FIG. 6 is a plan view partially in cross-section of the arrangement of FIG. 5.

FIGS. 3, 4, and 5 are elevation views in cross-section of the adapter 40 and of the connector plug 42 of the present invention, and FIG. 6 is a plan view thereof, illustrating the sequential action that takes place upon insertion of the plug 42 into the adapter 40 until it is latched in place. For simplicity, like elements in the several figures, including FIGS. 1 and 2, bear the same reference numerals.

In accordance with the invention in one embodiment thereof, the latching shoulders 35, which in prior art connectors are of plastic material, being molded along with the rest of the connector plug 18, of FIG. 1, for example, are replaced by a metallic, or other conductive material, bar 43 which extends transversely through latching arm 24 and protrudes from either side thereof in the same manner as replaced latching shoulders 35. Thus, the two ends of latching bar 43 perform the same latching function as the original shoulders 35. In the adapter 40 the inner end surfaces 44 of the latching ribs 30 form latching stops in the same manner as described with reference to FIGS. 1 and 2. Each latching stop or end 44 has a conductive coating or strip 46 thereon, which can, for mechanical strength and to insure electrical contact, extend partially along the adapter wall, as shown. As seen in FIG. 3a, the conductive coating 46 does not extend the full depth of the inner end surfaces 44, but only far enough for electrical contact in the fully latched position. Conductive leads 45 and 47 extend from the conductive coatings to the exterior and their function will be explained hereinafter. The strips 46, in this arrangement, comprise a part of the sensing mechanism and are spaced apart a predetermined distance as shown. Alternatively, shoulders 35 may be of plastic material and may have a coating of conductive material thereon connected together by a transverse conductive strip or other conductive member. Thus, bar 43 or conductive strip may function solely to connect the conductive material on the shoulder 35. In addition, it is within the purview of the invention that the latching arm 24 be made of conductive material, as well as shoulders 35, thereby eliminating the need for a conductive bar or strip.

FIG. 3 depicts the adapter 40 and the connector plug 42 prior to insertion of the latter into the former, whereas FIG. 4 depicts the plug 42 as partially inserted into adapter 40. As can be seen in FIG. 4, the bottom surfaces of ribs 30 bear against the shoulders formed by bar 43 and, consequently, cam latching arm 24 down in the deflected position, as shown, while the plug 42 is slid into place in adapter 40 and the arm is deflected. When the shoulders (or ends) of bar 43 pass the latching stop ends 44 of latching ribs 30 and clear them, the springs 33 push the plug end 20 rearward to make contact between bar 43 and contacts 46, the resilient arm 24, being unimpeded, springs upward into the latched position, as shown in FIG. 5. In this position, the ends of bar 43 bear against the conductive strip 46 and short them together, thereby shorting leads 47 together. FIG. 6 is a plan view in partial cross-section showing the bar or rod 43 in its latched and shorting position. It is to be understood that conductive strips 46 are representative of a number of possible contact arrangements. For example, holes may be bored in adapter 41 leading from the exterior to the ends 44 of the ribs 30 and contact pins (not shown) inserted therein, the ends of which are contacted by the bar 43 in the latched position. Whatever form of contact is used, it is necessary for it to occupy a position where the bar 43 makes firm contact therewith in the latched position. Also, the bar 43 may be shaped at its ends to make firm contact with the contact 46, as seen for example, in FIG. 5. It is also possible to apply a conductive strip on the conventional arm 24 extending from plastic shoulder 35 to the other shoulder 35, with shoulders 35,35 having a coating or surface of conductive material.

Figure 7:
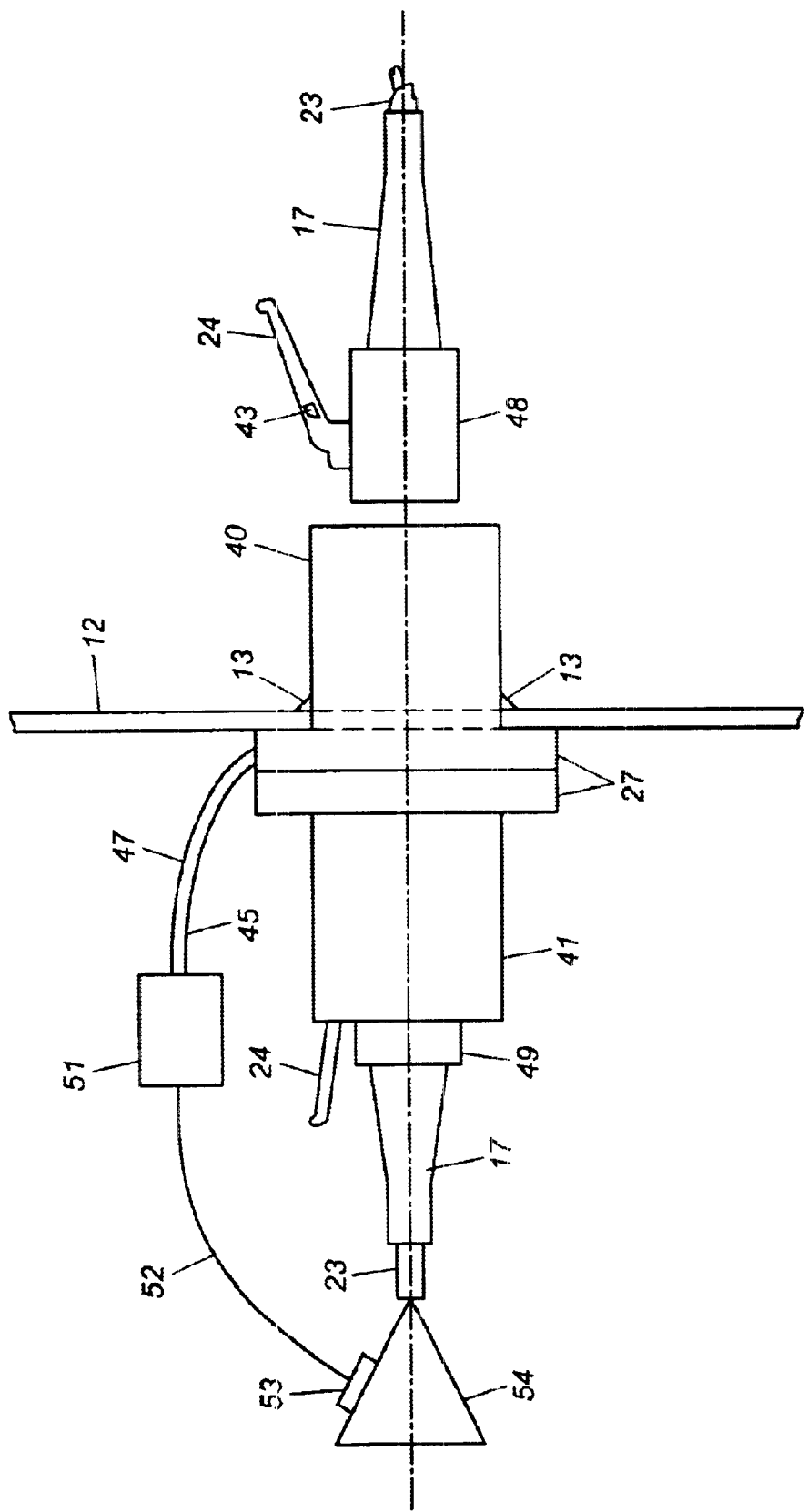
FIG. 7 is a diagrammatic view of a circuit arrangement for use with the plug and adapter of the present invention.

FIG. 7 is a diagrammatic view of the system of the present invention, showing the mating adapters 40 and 41 mounted to the panel 12, with a first connector plug 48 of the invention about to be inserted into an adapter 40 of the invention to mate with a second connector plug 49 positioned and latched into its adapter 41. Plug 49 and its adapter 41 may embody the present invention, although it is not necessary inasmuch as plug 48 and its adapter 40 operate with prior art arrangements as well as those embodying the invention. When plug 48 is inserted in its adapter 40 and bar 43 completes the electrical circuit between the leads 45,47, as explained hereinbefore, a processor unit 51, to which the leads 45,47 are connected, detects the completed circuit (or short) and generates a signal which is relayed along lead 52 to a switch unit 53 connected to a laser source 54, which supplies light power to connector plug 49, and is not turned on or activated until the arm 24 and the shorting bar 43 are seated in place and latched in adapter 40. As a consequence, the operator or installer at no time is subjected to laser light from laser 54, which was turned off while the first adapter 40 was empty. In like manner, when the plug 48 is to be removed, arm 24 must be depressed to unlatch the plug 48, which immediately removes bar 43 from contact with contacts 46, breaking the connection between the leads 45,47, while the plug 48 is still in place within adapter 40, although no longer latched thereto. When the processing unit 51 detects the break, it signals switch 53 to turn the laser 54 off. As a consequence, removal of plug 48 can proceed without danger to the operator. Of interest is the fact that when arm 24 is depressed prior to removal of plug 48, there is a slight forward movement of the ferrule of plug 48 which, therefore retains contact with the ferrule of plug 49 while allowing electrical contact to be broken and the laser 54 is being deactivated. Although such movement and retained contact between ferrules is not necessary, it does insure against damage to the ferrules when the high powered light circuit is broken. Because the de-activation of the laser is almost instantaneous, the retained contact is not necessary.

It can be seen from the foregoing that a high degree of safety and operator protection characterizes the present invention, and that implementation of the invention involves only make-break electrical circuitry, thereby enhancing reliability.

It is to be understood that the various features of the present invention might be incorporated into other types of optical connector arrangements and that other modifications or adaptations might occur to workers in the art. The various adapters with which the connector plug of the invention may be used may have configurations, including the sensing mechanism which are different than that shown, for illustrative purposes, in the foregoing, but which respond to the presence or absence of the plug for controlling the emitted light, or for other possible purposes. For example, the presence or absence of laser or other light might be signaled to the installer or craftsman by means of, for example, indicator lights on the panel. All such variations and modifications are intended to be included herein as being within the scope of the invention as set forth. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. An optical fiber connector plug comprising a housing member and an elongated latching arm, said latching arm having a first end hingedly attached to said housing and a second, distal, end spaced from said first end;

said latching arm having first and second latching shoulders extending transversely from the sides thereof intermediate said first and second ends, said latching shoulders being electrically conductive and electrically connected together.

2. An optical fiber connector plug as claimed in claim 1 wherein said latching arm is a resilient non-conductive member.

3. An optical fiber connector plug as claimed in claim 1 wherein said latching arm is a conductive member.

4. An optical fiber connector plug as claimed in claim 1 wherein said latching shoulders are formed by a bar of conductive material extending transversely of said latching arm and affixed thereto.

5. An optical fiber connector plug as claimed in claim 4 wherein said bar extends through said latching arm.

6. An optical fiber connector plug as claimed in claim 1 wherein said latching shoulders are of conductively coated plastic material.

7. An optical fiber connector plug as claimed in claim 6 wherein said latching shoulders are conductively connected together by a conductive strip extending therebetween.

8. For use in an optical fiber connector having an adapter and a connector plug insertable therein wherein the adapter has latching means and further has sensing means therein;

a connector plug having first and second electrically conductive latching shoulders for latching said plug to the latching means and for conductively engaging the sensing means when latched; said latching shoulders being electrically connected together.

9. An optical fiber connector plug of claim 8 wherein the sensing means in the adapter includes first and second electrical contacts spaced apart a predetermined distance;

wherein said latching shoulders are spaced apart the predetermined distance.

10. An optical fiber connector assembly comprising a connector plug having a front end and a ferrule extending therefrom, and an adapter for receiving said plug;

said adapter comprising an adapter housing having a rear wall having a member thereon for receiving the ferrule of the connector plug;

said adapter having first and second spaced conductive member and conductive leads extending therefrom;

said connector plug having a resilient latching arm having a latched position within said adapter wherein said arm engages said adapter, and a third conductive member mounted thereon, said conductive member being positioned to engage said spaced conductive members electrically when said latching arm is in the latched position.

11. A connector assembly as claimed in claim 10 wherein said first and second conductive members are transversely spaced within said adapter housing.

12. A connector assembly as claimed in claim 11 wherein said third conductive member extends transversely of said latching arm and has protruding ends extending from the sides thereof.

13. A connector assembly as claimed in claim 12 wherein said adapter housing has first and second longitudinally extending spaced latching ribs having ends within said housing forming latch stops adapted to be engaged by the protruding ends of said conductive member.

14. A connector assembly as claimed in claim 13 wherein said first and second conductive members are located at said latch stops.

15. A connector assembly as claimed in claim 14 wherein said first and second conductive members are conductive strips on the latch stop ends of said ribs.

16. An optical fiber connector assembly having first and second connector adapters joined together, first and second connector plugs adapted to be received in said first and second adapter respectively, and a light source for applying optical energy to at least said second plug, said assembly further comprising:

a sensing mechanism in said first connector adapter for sensing the particular condition signifying the presence or absence of a connector plug within said first adapter and producing a signal indicative of at least one of said conditions to produce a deactivation of said light source when the condition sensed is that of the absence of said first connector plug, and an activation of said light source when the condition sensed is that of said first connector plug seated and latched within said first connector adapter;

said sensing mechanism comprising first and second spaced conductive members within said first connector adapter and a third conductive member mounted on said first connector plug for connecting said first and second members together when said first connector plug is seated within said first connector adapter.

17. An optical fiber connector assembly as claimed in claim 16 and further comprising a control circuit to which said sensing mechanism is connected for determining when said first and second conductive members have been connected together for generating a signal to activate said light source.

18. An optical fiber connector assembly as claimed in claim 16 wherein said light source is a laser.

19. An optical fiber connector assembly as claimed in claim 16 wherein said third conductive member includes latching shoulders for latching said first connector plug to said first connector adapter.

* * * * *